Patented Dec. 13, 1927.

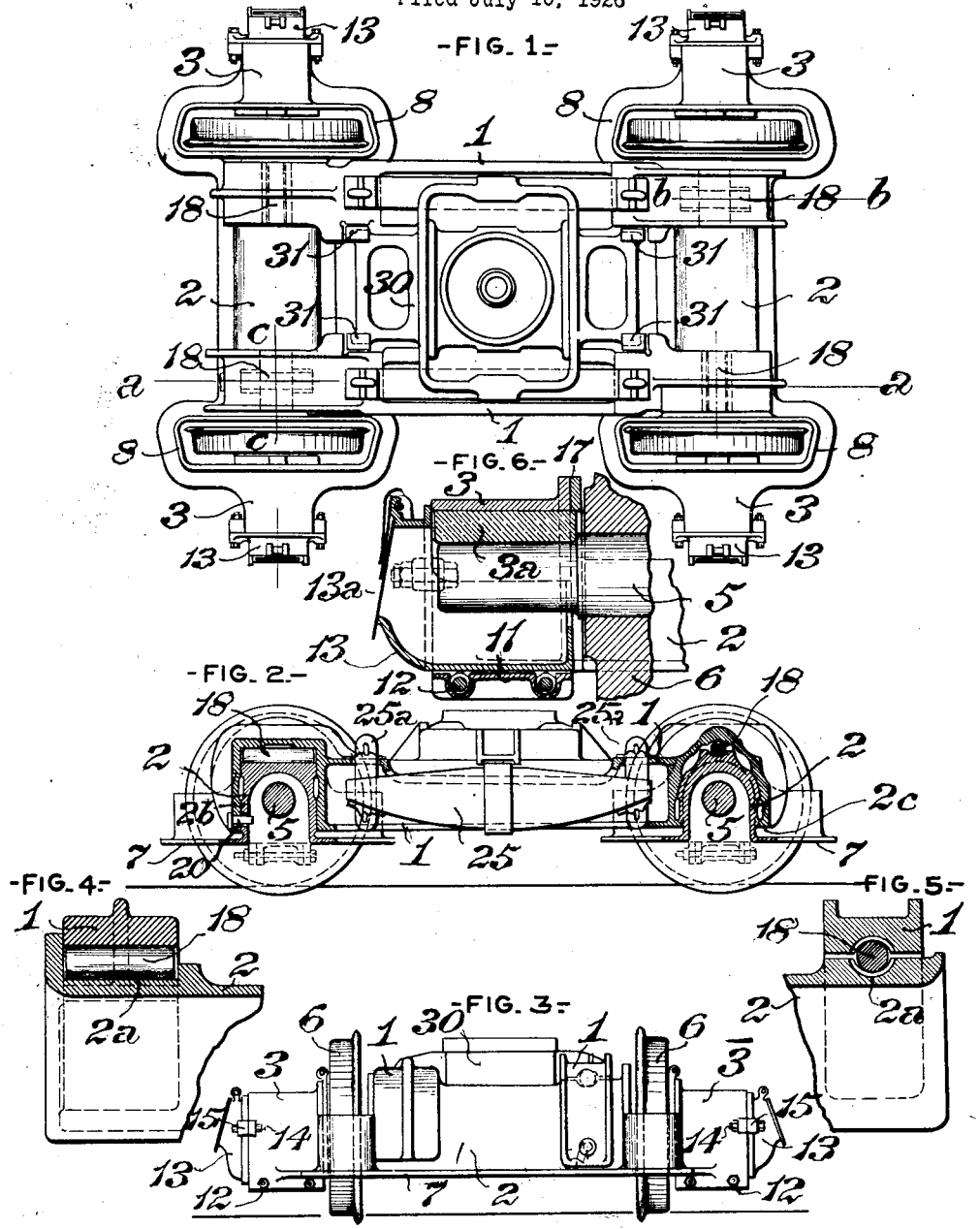

1,652,657

UNITED STATES PATENT OFFICE.

JAMES G. BLUNT, OF SCHENECTADY, NEW YORK.

TRUCK FOR LOCOMOTIVE ENGINES.

Application filed July 10, 1926. Serial No. 121,571.

My invention relates to locomotive trucks of the type having four wheels, the journals of which are disposed on their outer sides, as exemplified in an application for Letters Patent of the United States, filed by me April 21, 1926, Serial No. 103,456.

The object of my present invention is to provide a locomotive truck of the type referred to, which will be of greater simplicity, structurally, and greater flexibility, operatively, than those of the prior art, and that of my application Serial No. 103,456 aforesaid.

The improvement claimed is hereinafter fully set forth.

The truck structure set forth in my application Ser. No. 103,456, comprises two transverse end frame members, each of which carries the journal boxes of one end of the truck, and two longitudinal frame members, each bearing on one of the end members, through two trunnions, the axes of all the four trunnions being in longitudinal planes of the truck, and their purpose being to permit one side of the truck to rise or fall, relatively to the other side, as effected by inequalities in the track.

Under my present invention, the axes of the four trunnions, instead of being all longitudinal, as above stated, are so relatively disposed that the axes of the two trunnions at diagonally opposite corners of the truck are in longitudinal planes thereof, and the axes of the two other trunnions are in transverse planes of the truck, whereby a truck structure of greater flexibility is provided. Further, the trunnions of the truck of my prior application are formed integrally with the ends of the longitudinal frame members, while, under my present invention, sections of rolled round bars, seating in grooves of substantially semi-cylindrical transverse section, are provided, correspondingly effecting greater simplicity of construction.

In the accompanying drawing: Figure 1 is a plan or top view of a locomotive truck, illustrating an embodiment of my invention; Fig. 2, a vertical longitudinal section, through the same, on the line $a\ a$ of Fig. 1; Fig. 3, a rear end view; Fig. 4, a vertical longitudinal section, on an enlarged scale, on the line $b\ b$ of Fig. 1; Fig. 5, a vertical transverse section on the line $c\ c$ of Fig. 1; and, Fig. 6, a vertical longitudinal central section, on an enlarged scale, through one of the journal boxes.

In the practice of my invention, referring descriptively to the specific embodiment thereof which is herein exemplified, the frame of the truck comprises two longitudinal frame members, 1, 1, and two transverse frame members, 2, 2, located at the ends of the truck, and transmitting the weight imposed upon the longitudinal members, to the axles, 5, and the wheels, 6, secured thereon, the axles rotating in bearings of the usual type, which are fitted in journal boxes, 3, formed integral with the transverse members, 2, and projecting upwardly from the ends thereof.

The transverse frame members comprise main girder portions, which are arched, or of inverted U section, over the axles, 5, and yoke shaped end portions, each surrounding one of the wheels and merging into the adjacent journal box, 3. Bottom flanges, 7, are formed on the transverse members, extending from one of their journal boxes to the other, and vertical webs, 8, are formed on their inner faces, where they surround the wheels, said flanges merging into the sides of their main girder portions. The ribs, 8, are made of proper depth to allow clearance from the cylinders of the locomotive, and permit the removal of the cylinder parts, when desired.

For the purposes of assembly, it is necessary that the journal boxes, 3, should be open at bottom, in order that they may be placed over the axles, and the spaces between the jaws of the journal boxes are thereafter closed by binders, 11, secured by bolts, 12, and presenting flat top surfaces. The usual journal bearings, 3ª, and combined cellars and covers, 13, are then inserted from the outside, and the cellars secured to the journal boxes by bolts, 14, passing through lugs, 15. The faces of the journal boxes adjoining the wheel hubs are adapted to receive removable hub liners, 17. Ordinary car journal box lids, 13ª, are applied with the cellars and covers, to close the openings through which the lubricant is inserted, as in tender and car trucks.

Seats, 2ª, of substantially semi-cylindrical transverse section, are formed on the tops of the transverse frame members, 2, for the reception of trunnion rollers, 18, which are sections of rolled cylindrical bars, and through which the longitudinal frame members, 1, are supported on the transverse frame members, in order to provide desired flexibility in the truck frame. A leading and characteristic feature of the present invention, is the relative disposition of the axes of the trunnion seats at right angles one to the other, at the opposite ends of the transverse frame members, that is to say, the trunnion seat at one end being in a longitudinal plane of the truck, and that at the other end being in a transverse plane, as clearly indicated in Fig. 1. As shown in Fig. 4, the arched main or middle portions of the transverse frame members, 2, are, at the ends of the longitudinal frame members, 1, at which the trunnion rollers are located in longitudinal planes of the truck, formed in open bottomed rectangular sections, the flat tops of which constitute the roller seats, 2ª, and the adjoining ends of the longitudinal frame members 1, are adapted to fit down against vertical side walls, 2ᵇ, at the opposite ends of the roller seats. Said side walls provide bearing surfaces through which the pushing effort of the engine is transmitted to the truck. Pins, 20, fitted in the longitudinal frame members, and fitting in slightly enlarged holes in the walls, 2ᵇ, permit the necessary relative movements of the truck members, but prevent their disengagement, as in cases of derailment. At the opposite ends of the longitudinal frame members, where the axes of the trunnion rollers are in transverse planes of the truck, or at right angles to the truck axles, as shown in Fig. 5, the roller seats are formed in the tops of the arched portions of the transverse frame members, and the corresponding ends of the longitudinal frame members are formed to rest against the arched portions of the transverse frame members, bearing surfaces being thereby provided to transmit the pushing effort of the engine to the truck. Lips, 2ᶜ, are formed on the transverse frame members, with proper clearance to permit the necessary relative movement of the truck members, but prevent their disengagement in case of derailment. In assembling the frame, it is necessary to impose the longitudinal members, 1, on the transverse members, 2, at points close to their middle, and, thereafter, slide them outwardly into the positions they normally occupy, in order that the lips, 2ᶜ, may be brought under the surfaces against which they would strike, in the event of a tendency for the frame members to become disengaged.

As in my application Serial No. 103,456 aforesaid, the longitudinal frame members, 1, are preferably girders, of two channel sections, set back to back, and spaced sufficiently far apart for the interposition between them of springs, 25, and spring hangers, 25ª, the girders being connected by top walls, extending inwardly from the ends on opposite sides of the spring hangers. The longitudinal frame members, 1, are, as previously described, formed, at their extremities, into suitable trunnion bearings, so as to make properly fitted relation with the transverse frame members. The two longitudinal frame members being exactly similar, only one pattern is required for casting them.

The truck bolster, 30, is an integral casting, which is supported at the transverse centre line of the truck on the springs, 25, and is provided, at its corners, with spacing shoes, 31, lipped at top and bottom, to eliminate bolts. The shoes serve to space the side frame members apart, to transmit the pushing effort on the centre plate, to the journal boxes, and to absorb the wear due to the movements, in the vertical plane, of the bolster, relatively to the frame members, 1, similarly to the general manner of the movements, relatively, of a journal box and a pedestal. When applied to the bolster, and the bolster lowered into place, they are completely housed, and, therefore, cannot become disconnected or displaced. Their front faces are oppositely bevelled at top and bottom, to permit one end of the truck to rise and fall, relatively to the other end, without disturbing the equilibrium of the bolster.

The centering appliance, which is a necessary part of an engine truck, is not set forth herein, as my invention is adaptable in connection with any of the accepted means for centering, such as swing links, rockers, or geared rollers, which, moreover, do not form part of my present invention.

I claim as my invention and desire to secure by Letters Patent:

1. In a four wheel locomotive truck, the combination of two longitudinal side frame members; two transverse frame members, each carrying end journal boxes; and trunnion rollers, interposed between the longitudinal and the transverse frame members, and supporting the former upon the latter.

2. In a four wheel locomotive truck, the combination of two longitudinal frame members; two transverse frame members, each carrying end journal boxes; trunnion rollers, interposed between the longitudinal and the transverse frame members, and supporting the former upon the latter; and means for preventing accidental displacement of the frame members.

3. In a four wheel locomotive truck, the combination of two longitudinal side frame members; two transverse frame members, each carrying end journal boxes; trunnion rollers interposed between the longitudinal and the transverse frame members; and roller seats, located at right angles one to another, in each transverse frame member, and supporting the trunnion rollers thereof.

4. In a four wheel locomotive truck, the combination of two longitudinal side frame members; two transverse frame members, each carrying end journal boxes; trunnion rollers, interposed between the longitudinal and the transverse frame members; and roller seats, located at right angles, one to the other, in each transverse frame member, and in one of said members, relatively to the roller seats of the other, and supporting the trunnion rollers of the transverse members.

5. In a four wheel locomotive truck, the combination of two longitudinal side frame members; two transverse frame members, each carrying end journal boxes, and arched intermediately into inverted U section, to stand over a truck axle; trunnion rollers, interposed between the longitudinal and the transverse frame members; and roller seats, located at right angles, one to the other, in each transverse frame member, and supporting the trunnion rollers thereof.

6. In a four wheel locomotive truck, the combination of two longitudinal side frame members; two transverse frame members; journal boxes on the ends of said transverse frame members; combined lubricant cellars and journal box covers, connected to, and closing the ends of, the journal boxes; and means for supporting the longitudinal frame members upon the transverse frame members, with the capacity of relative movement.

7. In a four wheel locomotive truck, the combination of two longitudinal side frame members; two transverse frame members; journal boxes on the ends of said transverse frame members; combined lubricant cellars and journal box covers, connected to, and closing the ends of, the journal boxes; trunnion rollers, interposed between the longitudinal and the transverse frame members; and roller seats, located at right angles, one to the other, in each transverse frame member, and supporting the trunnion rollers thereof.

8. A transverse frame member for a four wheel locomotive truck, comprising, in an integral casting, a main girder body; yoke shaped portions at the ends of the body, each adapted to surround one of the wheels of a truck axle; journal boxes, at the outer ends of said yoke shaped portions; and roller seats in its top, adjoining said yoke shaped portions.

9. A transverse frame member for a four wheel locomotive truck, comprising, in an integral casting, a girder body of arched or inverted U section to stand over a truck axle; yoke shaped portions at the ends of the body, each adapted to surround one of the wheels of a truck axle; journal boxes at the outer ends of said yoke shaped portions; and roller seats in its top, adjoining said yoke shaped portions.

JAMES G. BLUNT.